Sept. 21, 1943.  G. W. GLAZIER  2,329,985
DUPLICATE PICTURE PRODUCING APPARATUS
Filed Dec. 23, 1942  5 Sheets-Sheet 1
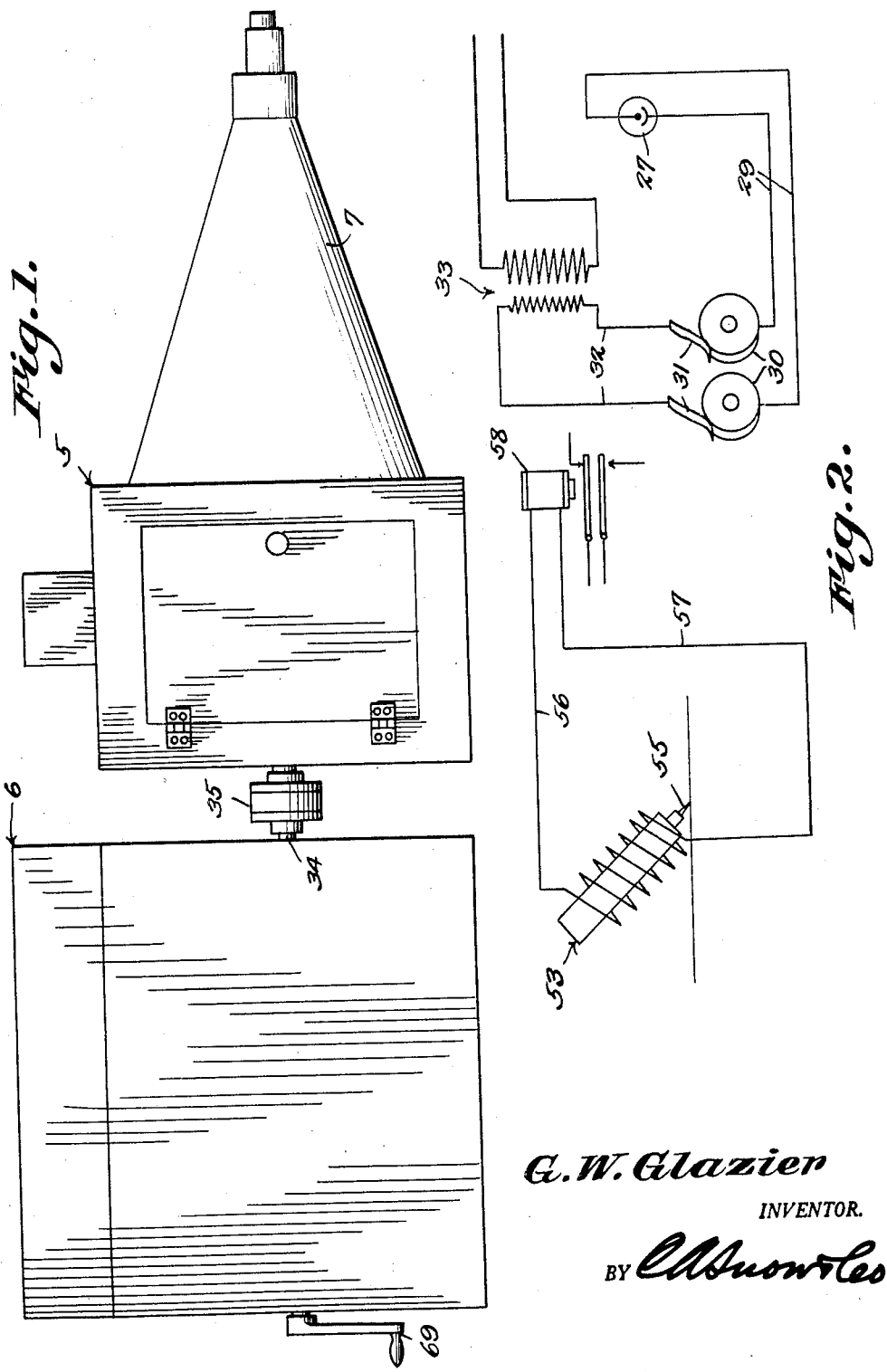
G. W. Glazier
INVENTOR.

Sept. 21, 1943.     G. W. GLAZIER     2,329,985
DUPLICATE PICTURE PRODUCING APPARATUS
Filed Dec. 23, 1942     5 Sheets-Sheet 2
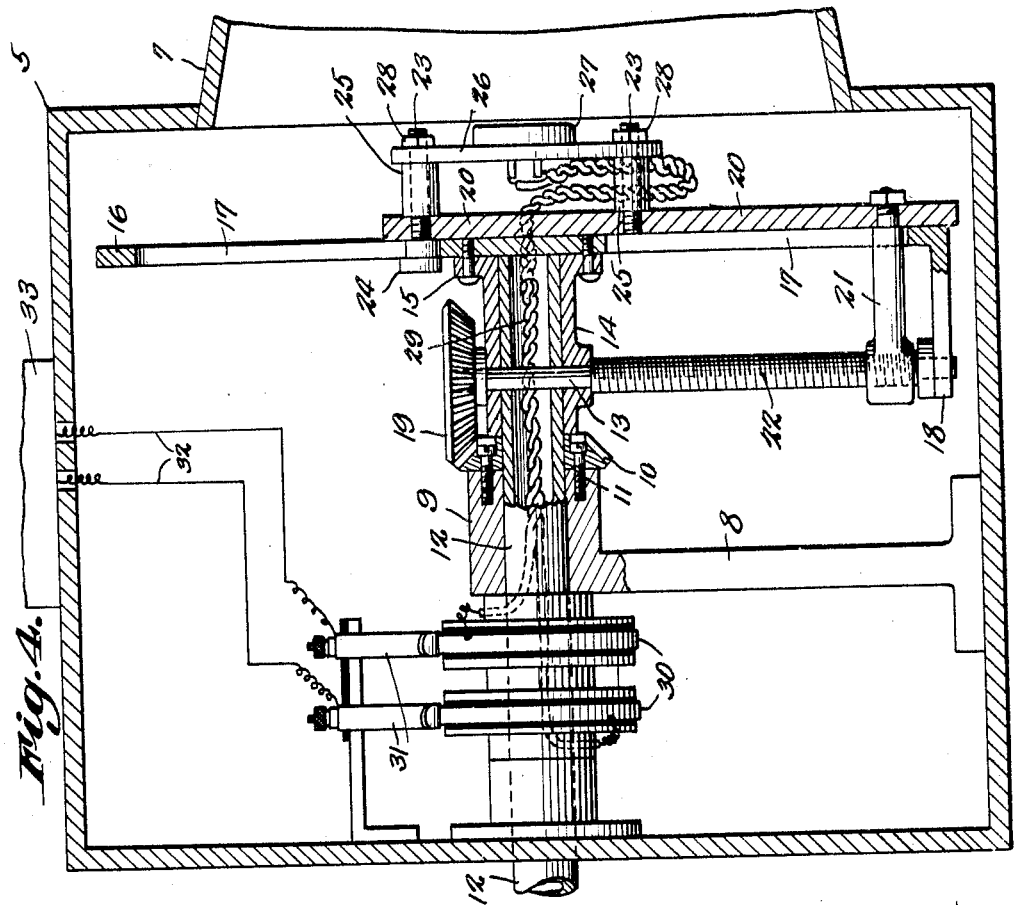
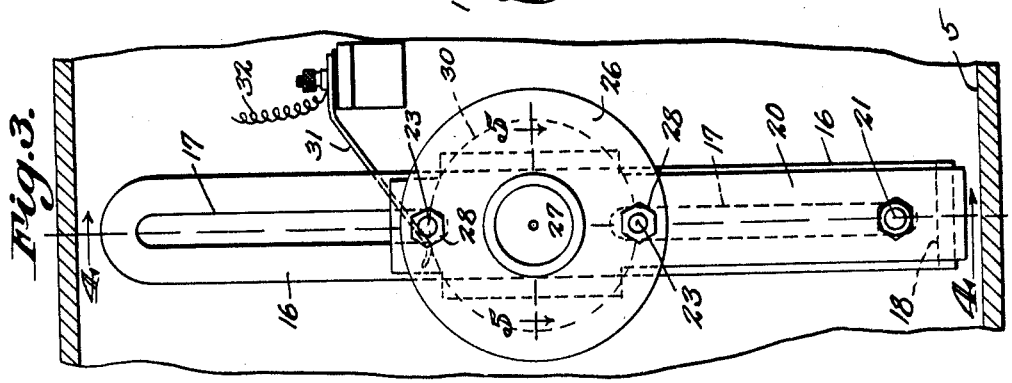
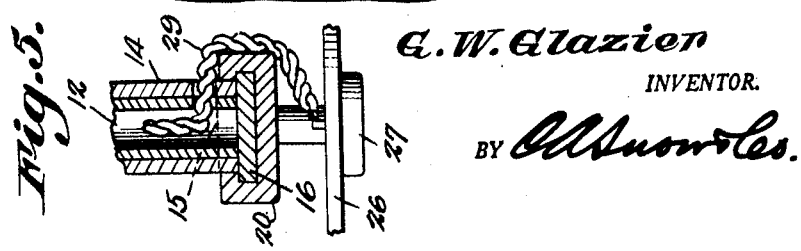
G. W. Glazier
INVENTOR.
BY Knowles.

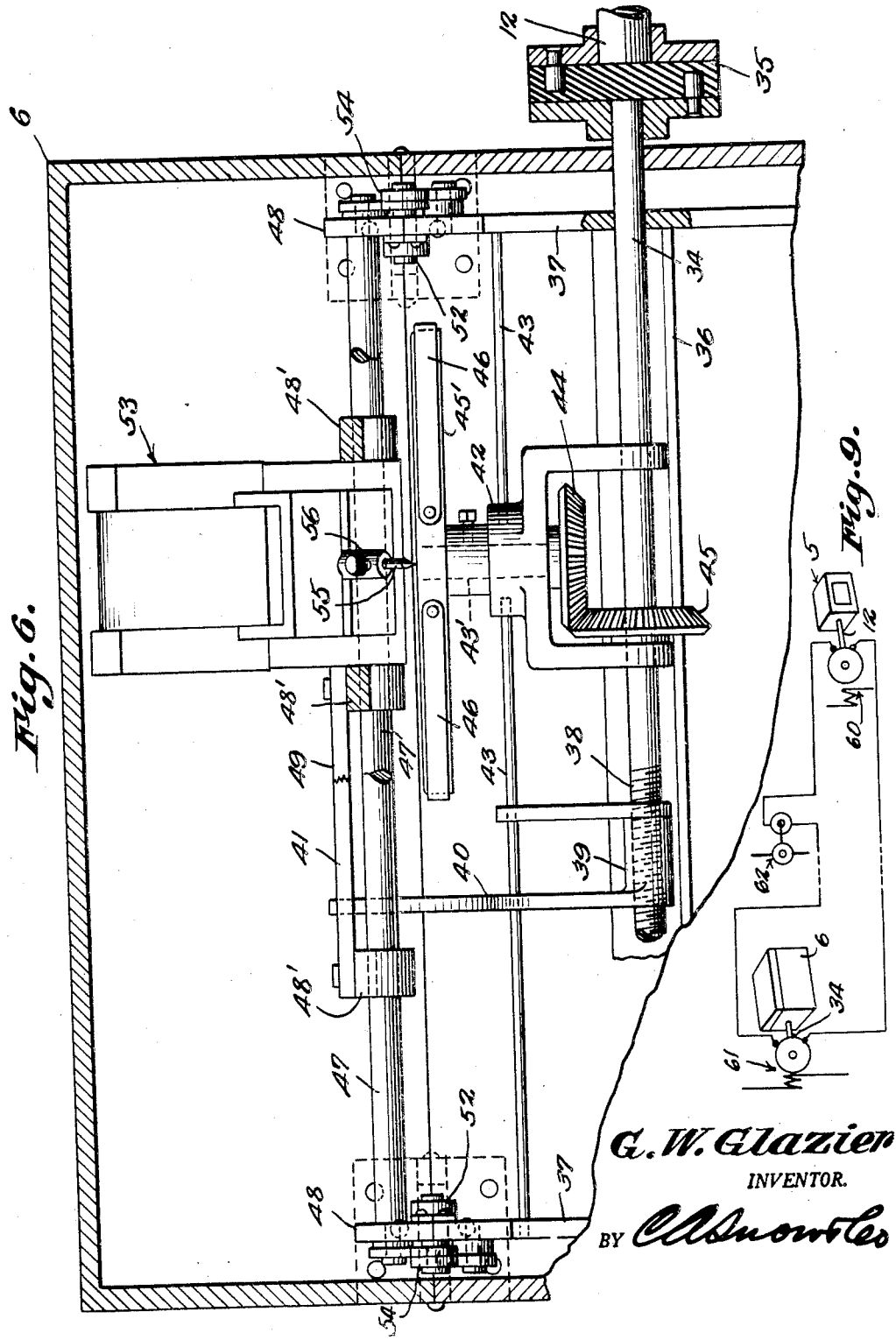

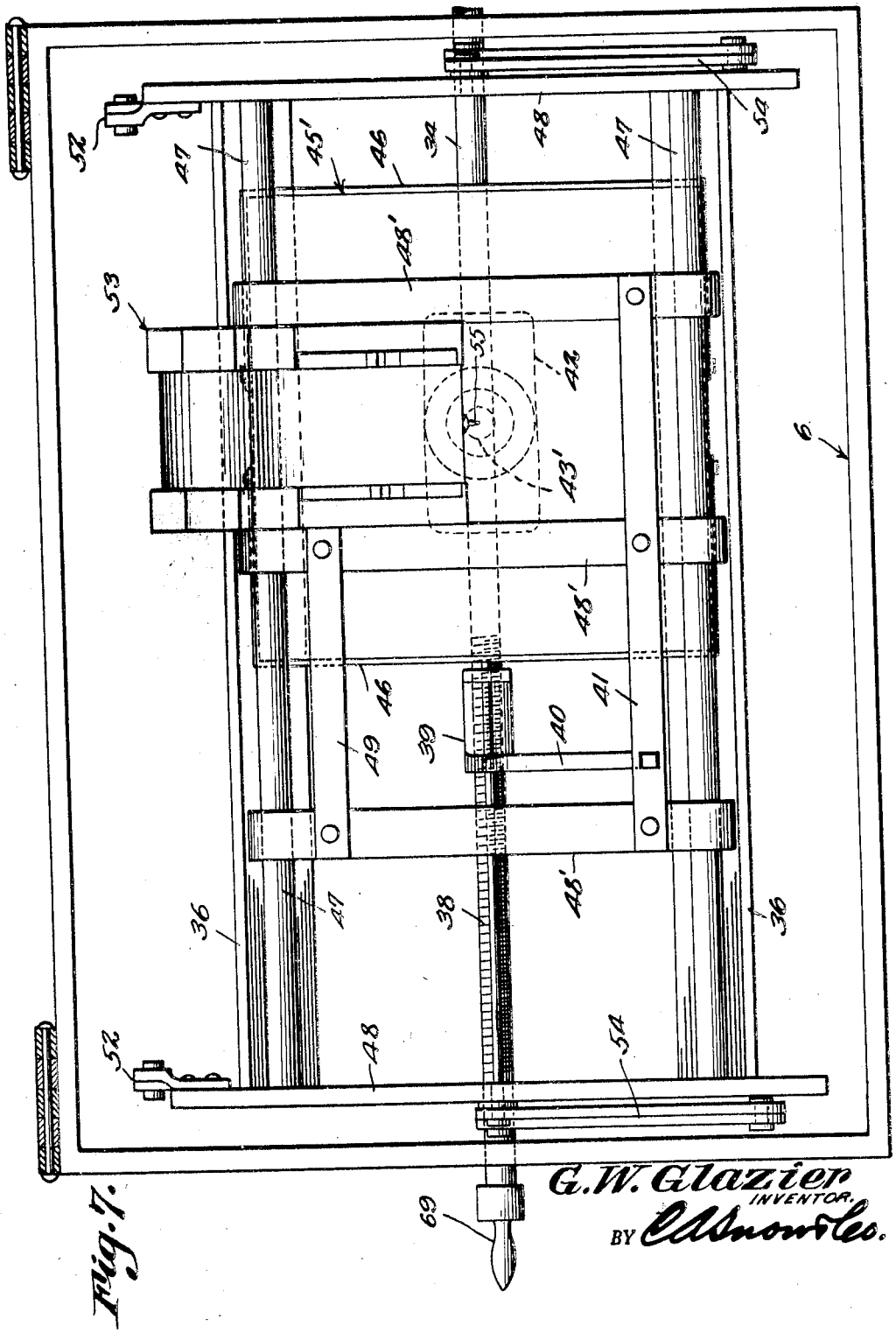

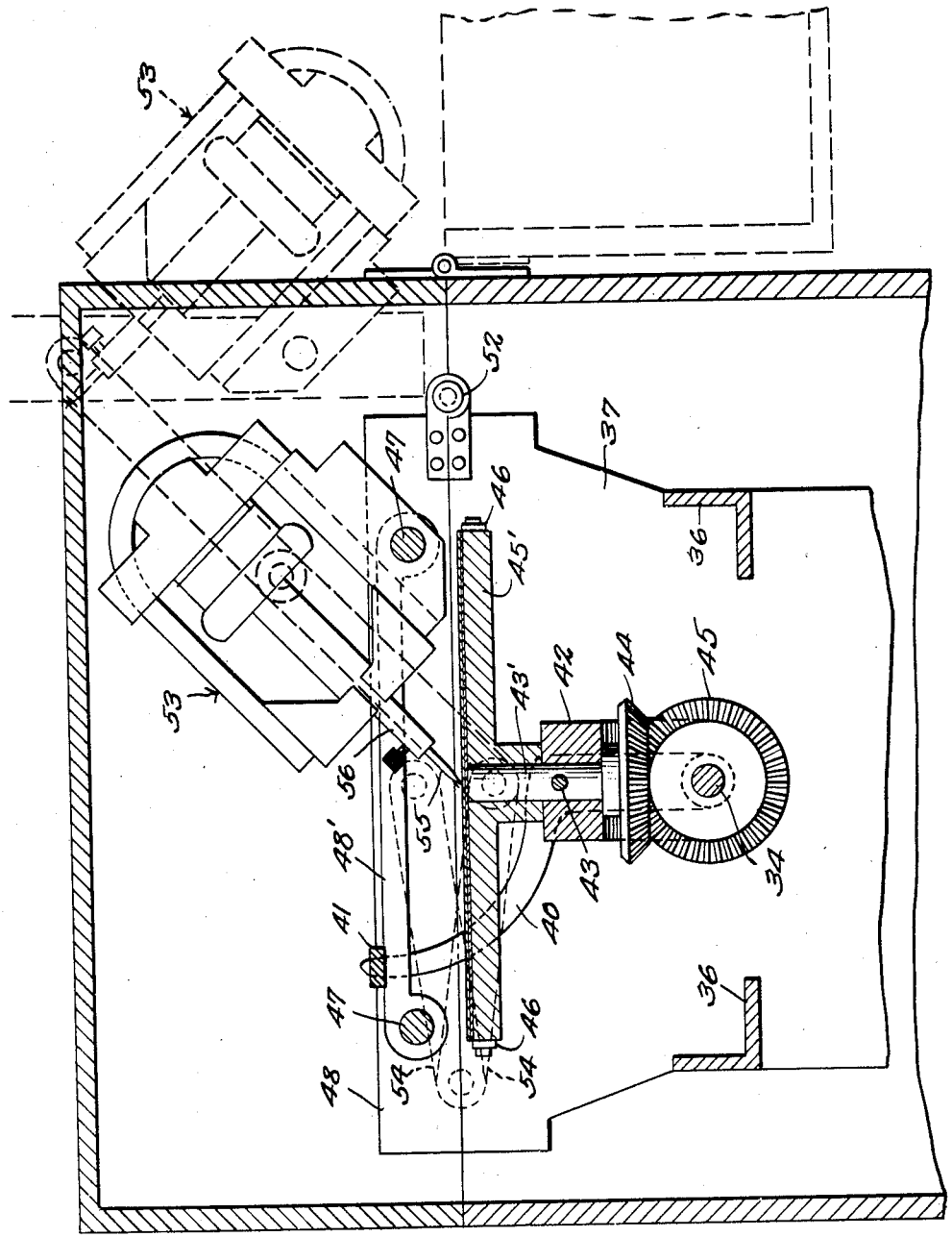

Patented Sept. 21, 1943

2,329,985

UNITED STATES PATENT OFFICE 2,329,985

DUPLICATE PICTURE PRODUCING APPARATUS

George W. Glazier, Savannah, Mo.

Application December 28, 1942, Serial No. 470,408

8 Claims. (Cl. 178—6.6)

This invention relates to an apparatus designed for use in producing a picture or visual record of the effect of light rays directed to a photo-electric cell, by the use of an electrical magnetically operated stylus, moving over a recording sheet and controlled by the varying light intensities directed to the photo-electric cell.

An important object of the invention is to provide means for mounting the photo-electric cell, together with mechanical means for operating the same, so that the photo-electric cell will be regulated in its movements over a predetermined area, insuring accuracy in the production of the picture or recording.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view of an apparatus constructed in accordance with the invention.

Figure 2 is a diagrammatic view illustrating the electrical circuits of the apparatus.

Figure 3 is a front elevational view of a portion of the photo-electric cell housing, the hood of the photo-electric cell having been removed.

Figure 4 is a vertical sectional view through the photo-electric cell housing, illustrating the photo-electric cell support, the view being taken on line 4—4 of Figure 3.

Figure 5 is a sectional detail view illustrating the support for the photo-electric cell.

Figure 6 is a longitudinal sectional view through the housing in which the stylus and rotary recording sheet support is mounted.

Figure 7 is a plan view of the stylus support and paper recording sheet support, the cover of the housing having been removed.

Figure 8 is a sectional view through the housing in which the stylus and recording sheet support are mounted, the magnetic stylus support being shown as moved to its inactive position, and illustrated in dotted lines.

Figure 9 is a diagram illustrating the principle of the invention as used in connection with synchronized electric motors.

Referring to the drawings in detail, the reference character 5 designates the photo-electric cell housing or cabinet, and the reference character 6 designates the stylus and record circuit housing.

As shown, the photo-electric cell housing 5 is provided with a forwardly tapered hood 7 provided with a suitable opening to admit light to the hood and interior of the housing 5.

Mounted in the housing 5, is a bracket 8 which has a bearing 9 at its upper end to which the bevelled gear 10 is secured, by means of bolts 11.

The bearing 9 supports the tubular shaft 12 which is formed with openings, through which the threaded shaft 13 extends, the threaded shaft also passing through openings in the tubular support 14 which is positioned over the end of the tubular shaft 12.

At the forward end of the tubular support 14, is a flange 15, which flange connects with the supporting plate 16 which is substantially long, and extends at right angles to the shaft 12. Elongated openings 17 are formed in the supporting plate 16 and extends from the center portion of the plate 16, to points adjacent to the ends thereof. At the lower end of the plate 16 is an arm 18 that extends rearwardly within the housing, the free end of the arm providing a support for the lower end of the shaft 13, which is threaded throughout the greater portion of its length.

A pinion indicated at 19 is secured at the upper end of the threaded shaft 13 and meshes with the bevelled gear 10.

The reference character 20, designates a supporting bar, to which the arm 21 is connected, the arm 21 being provided with a threaded opening adapted to move over the threaded portion 22 of the shaft 13, as the shaft 13 rotates, for purposes to be hereinafter more fully described.

The supporting bar is formed with openings, through which the bolts 23 extend, the upper bolt 23 being formed with a head 24 to hold the upper end of the supporting bar 20 to the plate 16 but permit of vertical sliding movement of the bar 20, with respect to the plate 16.

Spacers 25 are positioned on the bolts 23 and engage the plate 26 that in turn provides a support for the photo-electric cell 27, the plate 26 being held on the bolts, by means of the nuts 28.

The tubular shaft 12, being hollow, provides a housing for the wires 29 that connect with the photo-electric cell 27, and also have connection with the contact disks 30 that in turn are secured to the tubular shaft 12 to rotate therewith.

The reference character 31 designates contact brushes that are supported within the housing 5 and wipe the contact disks 30, so that electric energy may pass to the photo-electric cell 27.

The brushes 31 are in circuit with a source of electricity supply not shown, through the wires 32, there being a transformer 33 in the circuit to adapt the device for use in the usual service line.

Supported within the stylus housing 6, and extending through the front end thereof, is a shaft 34 which is connected with the tubular shaft 12, through the coupling 35. Secured within the stylus housing 6, is a frame embodying angle bars 36 that connect with the end plates 37 which are formed with bearings in which the shaft 34 operates. The shaft 34 is provided with a threaded portion 38 over which the tubular support 39 operates. The arm 40 is formed integral with the tubular support 39 and extends laterally and upwardly, where it passes through an opening in the bar 41 forming a part of the stylus supporting carriage.

The record surface or support for the record sheet, embodies a substantially inverted U-shaped member 42 that has openings through which the shaft 34 extends, there being provided rods 43 that extend from the end plate 37 and engage the member 42, holding the member 42 against movement longitudinally of the housing 6.

A bearing is formed in the member 42, in which bearing the vertical shaft 43' is positioned, the shaft 43' carrying a bevelled pinion 44 at its lower end which in turn meshes with the bevelled pinion 45, which is secured to the shaft 34. At the upper end of the vertical shaft 43' is the record sheet table 45', which is secured to the shaft to move therewith. Pivotally connected with the table 45', are clamping members 46 which are adapted to move over the edges of the table 45' to clamp a record sheet to the table. The record sheet table is rectangular in construction, and the clamping members 46 are shaped to conform to the shape of the table, so that a square sheet on which the recording is made, may be clamped without wrinkling or buckling the recording sheet.

Rods 47 connect with the end bars 48 and provide a track for the stylus supporting carriage. The stylus supporting carriage embodies transversely disposed bars 48', which are formed with openings adjacent to their ends, to receive the rods 47 so that the stylus 45 may move longitudinally of the rods 47. The bars 48' are held in spaced relation with respect to each other, by means of the bar 41 and bar 49. Thus it will be seen that due to this construction, as the tubular support 39 moves longitudinally of the shaft 34, movement of the tubular support 39 will be transmitted to the stylus 45, to move it longitudinally of the supporting rods 47.

The end bars 48 rest directly on the upper edges of the end plates 37, and are hingedly connected thereto, by means of the hinges 52. The electro-magnetic stylus support, which is indicated generally by the reference character 55 is mounted directly on the carriage, so that the stylus, which is supported by the electro-magnetic stylus support 53, may be swung upwardly, to the position shown in dotted lines in Figure 8 of the drawings, to the end that the operator will have ready access to the recording surface for replacing or removing the recording sheet.

Pivoted links indicated at 54 are connected with the end bars 48 and the end plates 37, so that when the carriage is swung upwardly, the carriage will be held in such position by the links.

The stylus is indicated by the reference character 55 and is held in the stylus support 56 which is actuated by the electro-magnet, forming a part of the stylus support.

The electro-magnet of the stylus support, is in circuit with the photo-electric cell, through the wires 56 and 57, the relay 58 being in the circuit for controlling the electric current passing therethrough.

The shaft 34, constitutes the power shaft of the apparatus, and is of a length to extend through the front end of the stylus housing 6, where it is supplied with a handle 69, providing means whereby the operator may rotate the handle to operate the apparatus.

In Figure 9 of the drawings, I have illustrated a diagram wherein the photo-electric cell 5 is operatively connected with the stylus operating mechanism, that in turn is operated by means of the motor 60 which is synchronized with the motor 61, so that movements of the motor 60 will control the movements of the motor 61. The motor 61 operates the stylus to cause the same to operate over a recording surface, to the end that recordings may be made through the medium of a photo-electric cell located at a remote point from the stylus operating mechanism.

In the use of the apparatus, the apparatus is positioned directly in front of the photograph or picture to be reproduced, the hood 7 being directed at the center of the photograph or picture to be duplicated. The electric switch controlling the circuit between the electro-magnetic stylus support and photo-electric cell, is now closed completing the circuit. The operator rotates the handle 69, which in turn rotates the shaft 34, and since the shaft 13 drives the pinion or bevel gear 19 that meshes with the stationary bevel gear 10, the shaft 13 is rotated in its bearings, and at the same time is rotated around the beveled gear 10. Since the shaft 13 provides a support for the plate 16, through the arm 18, the plate 16 is naturally rotated, causing a corresponding rotation of the photo-electric cell 27. During the actual rotation of the plate 16, the arm 21 is moved inwardly, due to the threaded portion 22 of the shaft 13 cooperating with the threads of the arm 21. This movement will cause the supporting bar 20, together with the photo-electric cell 27, to be fed outwardly, towards the outer end of the elongated opening 17.

The photo-electric cell 27 being sensitive to variations in density of the picture or photograph which is in focus therewith, will cause the photo-electric cell to react on the stylus, through the electro-magnetic stylus support, with the result that the variations of pressure will be directed to the stylus as it moves over the record sheet supported on the record sheet table 45'. It might be further stated, that the record sheet is positioned on the record sheet table 45', a carbon sheet being held directly under the record sheet, so that pressure directed to the stylus, will be recorded on the under surface of the record sheet.

The operator continues to rotate the handle 69, which as before stated, causes the photo-electric cell to gradually move transversely while it is forming a spiral path over the entire surface of the picture or photograph being reproduced, with the result that the stylus is correspondingly moved over the record sheet, reproducing the photograph or picture on which the photo-electric cell is focused, on the record sheet.

What is claimed is:

1. In a picture reproducing apparatus, a photo-electric cell adapted to be directed to the center of a picture to be reproduced, a rotatable record sheet table, means for clamping a record sheet on the table, an electrically controlled stylus support, a stylus mounted on the support, said stylus being mounted in operative relationship with the record sheet positioned on the table, said stylus being sensitive to the action of said photo-electric cell through an electric circuit between the photo-electric cell and stylus support, means for rotating the table under the stylus whereby lines are drawn on the record sheet positioned on the table, producing a picture, and means for moving the stylus transversely of the record sheet.

2. In a picture reproducing apparatus, a stylus, a record surface over which the stylus operates in contact therewith, means for continuously rotating the record surface with respect to the stylus, in operative relationship with the record surface, means for moving the stylus in operative relationship with the record surface transversely of the record surface, means adapted to move the stylus transversely towards and away from the record surface varying the pressure on the stylus, producing recordings of various densities, said means embodying a photo-electric cell and an an electro-magnet stylus support in circuit with the photo-electric cell, and said magnetic stylus support being sensitive to the action of the photo-electric cell.

3. In a picture reproducing apparatus, a rotatable record sheet table adapted to support a record sheet thereon, a stylus adapted to operate over the record sheet in contact therewith, a stylus support comprising an electro-magnet, a photo-electric cell in circuit with the electro-magnet and adapted to be focused on a picture to be duplicated, said photo-electric cell adapted to control the movements of said stylus towards and away from the record sheet, varying the density of the markings caused by the stylus contacting with the record sheet, as the photo-electric cell is moved before the picture to be duplicated, whereby a picture is produced on the record sheet.

4. In a picture reproducing apparatus, a rotatable record sheet table adapted to support a record sheet thereon, a stylus adapted to operate over the record sheet in contact therewith, a stylus support comprising an electro-magnet, a photo-electric cell in circuit with the electro-magnet and adapted to be focused on a picture to be duplicated, said photo-electric cell adapted to control the movements of said stylus towards and away from the record sheet, varying the density of the markings caused by the stylus contacting with the record sheet, as the photo-electric cell is moved before the picture to be duplicated, whereby a picture is produced on the record sheet, means for rotating the photo-electric cell, and means for simultaneously moving the photo-electric cell at right angles to the axis of the photo-electric cell.

5. In a picture reproducing apparatus, a rotatable record sheet table adapted to support a record sheet thereon, a stylus, an electro-magnet on which the stylus is supported, said electro-magnet adapted to hold the stylus in operative relation with the record sheet, a photo-electric cell in circuit with the electro-magnet and adapted to be focused on an object to be reproduced, means for rotating the photo-electric cell and simultaneously moving the photo-electric cell laterally, and means for gradually moving the stylus transversely of the record sheet.

6. In a picture reproducing apparatus, a rotatable record sheet table, a stylus supported above the record sheet table and adapted to engage the record sheet positioned thereon, an electro-magnet providing the support for said stylus, a photo-electric cell in circuit with the electric magnet and adapted to control the action of the stylus, whereby pressure on the stylus is varied, producing a recording on said record sheet, means for rotating the table and photo-electric cell simultaneously, means for feeding the stylus at right angles to the axis of the record sheet table, and means for simultaneously moving the photo-electric cell at right angles to the axis of rotation of the photo-electric cell.

7. In a picture reproducing apparatus, a rotatable record sheet table, a stylus supported above the table in operative relation with the record sheet positioned on the table, an electro-magnet including a carriage providing a support for said stylus, means for feeding said stylus at right angles to the axis of the table, a photo-electric cell in circuit with the electro-magnet and adapted to control the movement of the stylus towards and away from said record sheet, varying the degree of density of the line formed on the sheet by said stylus, a photo-electric cell in circuit with the electro-magnet and adapted to be focused on an object to be reproduced, a support for said photo-electric cell, means for rotating the photo-electric cell support simultaneously with the rotation of said table, means for moving the photo-electric cell at right angles to the axis of said photo-electric cell, said photo-electric cell support embodying an elongated plate having an elongated opening, and a supporting bar to which the photo-electric cell is connected, said supporting bar being movable longitudinally of said elongated opening.

8. In a picture reproducing apparatus, a rotatable record sheet table, an electro-magnet mounted above the table, a stylus supported by the electro-magnet and held in operative relation with a record sheet mounted on the table, a photo-electric cell in circuit with the electro-magnet, said photo-electric cell adapted to be focused on a picture to be reproduced, a power shaft adapted to rotate said table and photo-electric cell simultaneously, and mechanical means for moving the stylus support and photo-electric cell at right angles to their respective axis.

GEORGE W. GLAZIER.